US012040524B2

(12) United States Patent
Karhu

(10) Patent No.: US 12,040,524 B2
(45) Date of Patent: Jul. 16, 2024

(54) CAVITY FILTER ELEMENT FOR A CAVITY FILTER

(71) Applicant: NOKIA SOLUTIONS AND NETWORKS OY, Espoo (FI)

(72) Inventor: Kimmo Kalervo Karhu, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 72 days.

(21) Appl. No.: 17/706,080

(22) Filed: Mar. 28, 2022

(65) Prior Publication Data

US 2022/0328947 A1 Oct. 13, 2022

(30) Foreign Application Priority Data

Mar. 30, 2021 (FI) ..................................... 20215377

(51) Int. Cl.
*H01P 1/208* (2006.01)
*H01P 1/205* (2006.01)
*H01P 1/207* (2006.01)

(52) U.S. Cl.
CPC ............ *H01P 1/208* (2013.01); *H01P 1/2053* (2013.01); *H01P 1/207* (2013.01)

(58) Field of Classification Search
CPC ........ H01P 1/208; H01P 1/207; H01P 1/2053; H01P 1/202
USPC ....... 333/227, 231, 202, 203, 208–212, 24 C
See application file for complete search history.

(56) References Cited

U.S. PATENT DOCUMENTS

| | | | |
|---|---|---|---|
| 5,225,799 A | 7/1993 | West et al. | |
| 6,064,284 A | 5/2000 | Wakamatsu et al. | |
| 6,570,472 B1 | 5/2003 | Niiranen | |
| 2007/0126534 A1* | 6/2007 | Himi ......................... | H01P 7/10 333/219.1 |
| 2018/0301781 A1 | 10/2018 | Peng et al. | |

FOREIGN PATENT DOCUMENTS

| | | |
|---|---|---|
| CN | 206602161 U | 10/2017 |
| CN | 107615575 A | 1/2018 |
| EP | 2800201 A1 | 11/2014 |
| KR | 20170019876 A | 2/2017 |
| SE | 1950509 A1 | 10/2020 |
| WO | 2017113328 A1 | 7/2017 |
| WO | 2020/200318 A1 | 10/2020 |

OTHER PUBLICATIONS

Extended Search Report dated Aug. 8, 2022, corresponding to European Patent Application No. 22164195.4.
Office Action and Search Report dated Sep. 30, 2021 corresponding to Finnish Patent Application No. 20215377.
(Continued)

*Primary Examiner* — Rakesh B Patel
(74) *Attorney, Agent, or Firm* — SQUIRE PATTON BOGGS (US) LLP

(57) ABSTRACT

An apparatus comprising: at least one cavity filter element wherein the cavity filter element comprises a first support, a second support distinct from the first support, and a coupling element supported by the first support and the second support. In some examples, there is a series of cavity filter elements. In some examples, the cavity filter element(s) are part of a cavity filter.

16 Claims, 6 Drawing Sheets

(56) References Cited

OTHER PUBLICATIONS

Communication of Acceptance—Section 29 of Patents Decree dated Mar. 15, 2022 corresponding to Finnish Patent Application No. 20215377.
Chinese Office Action issued in corresponding Chinese Patent Application No. 202210325416.5 on Feb. 4, 2024.
European Office Action issued in corresponding European Patent Application No. 22 164 195.4-1205 on Jan. 18, 2024.

* cited by examiner

CAVITY FILTER ELEMENT FOR A CAVITY FILTER

TECHNOLOGICAL FIELD

Embodiments of the present disclosure relate to a cavity filter element for a cavity filter.

BACKGROUND

Cavity filters are a form of radio frequency filter that can have a reasonable size, a low operating band insertion loss and a high out of band attenuation.

A cavity filter has a plurality of cavity filter elements within electromagnetically coupled cavities. The cavity filter elements operate as resonators.

BRIEF SUMMARY

It would be desirable to have cavity filter elements of lower mass and/or lower cost and/or of a form suitable for automated manufacture.

According to various, but not necessarily all, embodiments there is provided an apparatus comprising at least one cavity filter element wherein the cavity filter element comprises a first support, a second support distinct from the first support, and a coupling element supported by the first support and the second support.

In some but not necessarily all examples, the first support comprises a first edge extending from a base, distal from the coupling element, to a top, proximal to the coupling element, and a second edge extending from a base, distal from the coupling element, to a top, proximal to the coupling element; wherein the second support comprises: a first edge extending from a base, distal from the coupling element, to a top, proximal to the coupling element, and a second edge extending from a base, distal from the coupling element, to a top, proximal to the coupling element; wherein the first support and the second support oppose each other across a gap, the first edge of the first support being separated from the first edge of the second support across the gap and the second edge of the first support being separated from the second edge of the second support across the gap.

In some but not necessarily all examples, the first support, the second support and the coupling element are electrically conductive, and a galvanic current path extends via the first support to the second support via the coupling element.

In some but not necessarily all examples, the first support, the second support and the coupling element are formed from a single piece of metal.

In some but not necessarily all examples, the first support, the second support and the coupling element are formed from a folded sheet of metal.

In some but not necessarily all examples, the coupling element comprises a deformable portion that can be deformed for tuning the cavity filter element.

In some but not necessarily all examples the apparatus comprises a series of cavity filter elements wherein the cavity filter elements comprise at least a first support, a second support distinct from the first support, and a coupling element supported by the first support and the second support.

In some but not necessarily all examples adjacent ones of the cavity filter elements are interconnected by metal interconnects.

In some but not necessarily all examples the metal interconnects extend between adjacent first supports of the cavity filter elements.

In some but not necessarily all examples the series of cavity filter elements and the metal interconnects are formed from a single piece of metal or from multiple interconnected components.

In some but not necessarily all examples, the apparatus comprises a first series of cavity filter elements wherein the cavity filter elements of the first series comprise: at least a first support, a second support distinct from the first support, and a coupling element supported by the first support and the second support; and a second series of cavity filter elements wherein the cavity filter elements of the second series comprise: at least a first support, a second support distinct from the first support, and a coupling element supported by the first support and the second support; and at least one conductive cross-coupling interconnect extending between a cavity filter element of the first series and a cavity filter element of the second series.

In some but not necessarily all examples the apparatus is configured as a cavity filter that comprises a conductive housing that provides conductive cavities for cavity filter elements.

In some but not necessarily all examples the cavity filter element is an inner conductor to a surrounding outer conductive cavity provided by the housing.

In some but not necessarily all examples the cavity filter elements are configured to have an electrical length, from a base of the first support or the second support of the cavity filter element to a top at the coupling element of the cavity filter element, that is substantially one quarter of a resonant wavelength of the cavity filter.

In some but not necessarily all examples there is a thermal expansion mismatch between the conductive housing and the cavity filter elements, such that with increasing temperature the conductive housing expands more than the cavity filter elements and gaps between the coupling elements of the cavity filter elements and the housing increase rather than decrease.

In some but not necessarily all examples the apparatus further comprises a transmitter and/or a receiver.

According to various, but not necessarily all, embodiments there is provided examples as claimed in the appended claims.

BRIEF DESCRIPTION

Some examples will now be described with reference to the accompanying drawings in which.

DETAILED DESCRIPTION

The following description describes various examples of apparatus comprising at least one cavity filter element 10. In some examples, the apparatus is the cavity filter element 10. In some examples, the apparatus is a series 100 of cavity filter elements 10. In some examples, the apparatus is a cavity filter comprising cavity filter elements 10.

In the following description, the cavity filter element 10 comprises a first support $\mathbf{12}_1$, a second support $\mathbf{12}_2$ distinct from the first support $\mathbf{12}_1$, and a coupling element 14 supported by the first support $\mathbf{12}_1$ and the second support $\mathbf{12}_2$.

Figure 1A:
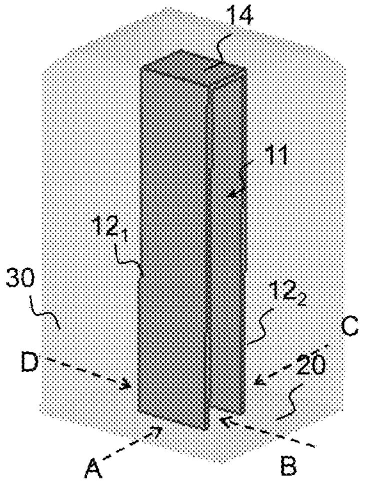
FIGS. 1A & 1B show an example of a cavity filter element from different perspectives.
Figure 1B:
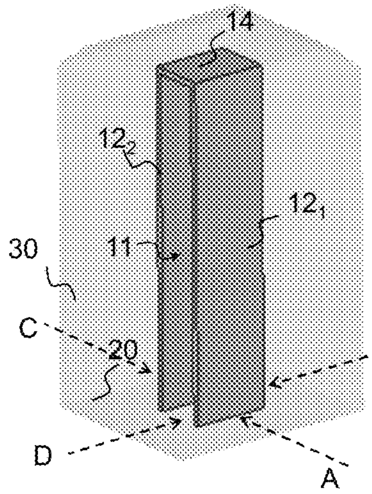

FIGS. 1A and 1B illustrate, from different perspectives a cavity filter element 10. The cavity filter element 10 comprises a first support $\mathbf{12}_1$, a second support $\mathbf{12}_2$ and a coupling element 14 supported by the first support $\mathbf{12}_1$ and the second support $\mathbf{12}_2$. The first support $\mathbf{12}_1$ and the second support $\mathbf{12}_2$, for example, can be separated by a gap 11.

The cavity filter element 10 is self-supported. No other supports are required to support the coupling element 14 other than the first support $\mathbf{12}_1$ and the second support $\mathbf{12}_2$.

The first support $\mathbf{12}_1$, the second support $\mathbf{12}_2$ and the coupling element 14 are, in this example, electrically conductive. For example, they can be formed from metal or metalized dielectric or plastic material.

A galvanic current path extends via the first support $\mathbf{12}_1$, the coupling element 14 and the second support $\mathbf{12}_2$.

In some but not necessarily all examples, the first support $\mathbf{12}_1$, the second support $\mathbf{12}_2$ and the coupling element 14 are formed from a single piece of metal. In some but not necessarily all examples, the first support $\mathbf{12}_1$, the second support $\mathbf{12}_2$ and the coupling element 14 are formed from a folded sheet of metal. The metal sheet can for example, be copper or silver-plated steel.

In this example, but not necessarily all examples, the first support $\mathbf{12}_1$, the second support $\mathbf{12}_2$ are flat sheets.

In this example, but not necessarily all examples, the first support $\mathbf{12}_1$, the second support $\mathbf{12}_2$ extend in parallel separated by a gap.

In some examples, the cavity filter element 10 is connected to a conductive base 20. A galvanic current path (a path by which dc current could but does not necessarily flow) extends from the conductive base 20 via the first support $\mathbf{12}_1$, the coupling element 14 and the second support $\mathbf{12}_2$ back to the conductive base 20.

In some examples, the cavity filter element 10 is positioned within a conductive cavity 30 of a cavity filter. In this example, the cavity filter element 10 functions as a resonator.

FIGS. 2A, 2B, 2C, 2D illustrate from the different perspectives A, B, C, D of the cavity filter element 10.

Figure 2A:
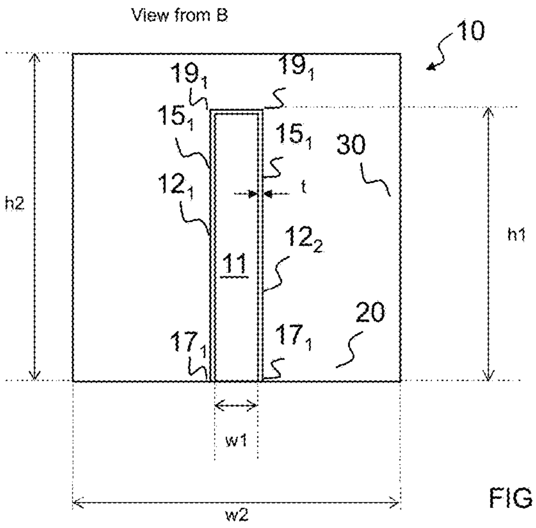
FIGS. 2A, 2B, 2C, 2D show an example of a cavity filter element from different perspectives.
Figure 2B:
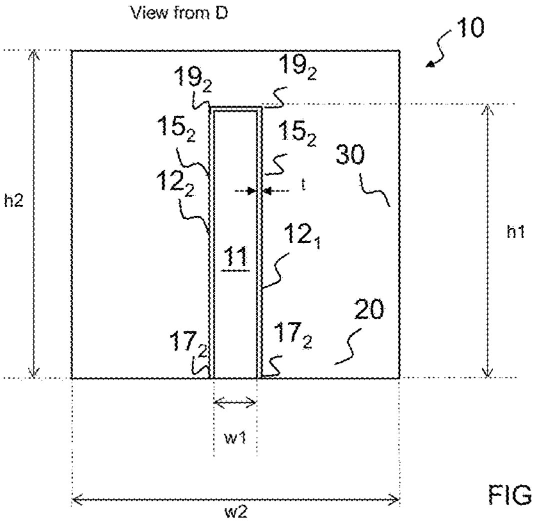
Figure 2C:
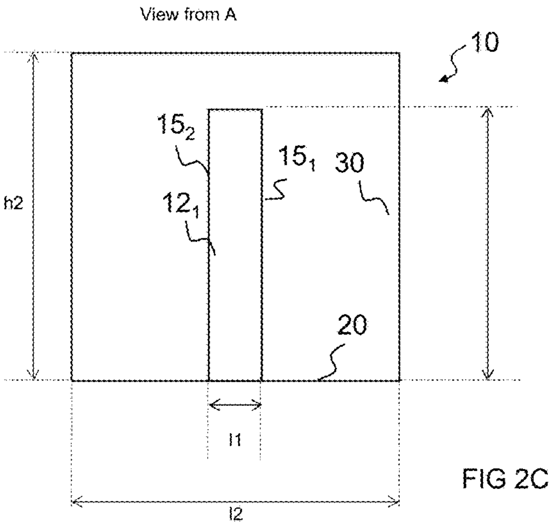

As illustrated in FIGS. 2A and 2C, the first support $\mathbf{12}_1$ comprises a first edge $\mathbf{15}_1$ extending from a base $\mathbf{17}_1$, distal from the coupling element 14, to a top $\mathbf{19}_1$, proximal to the coupling element 14.

As illustrated in FIGS. 2B and 2C, the first support $\mathbf{12}_1$ comprises a second edge $\mathbf{15}_2$ extending from a base $\mathbf{17}_2$, distal from the coupling element 14, to a top $\mathbf{19}_2$, proximal to the coupling element 14.

Figure 2D:
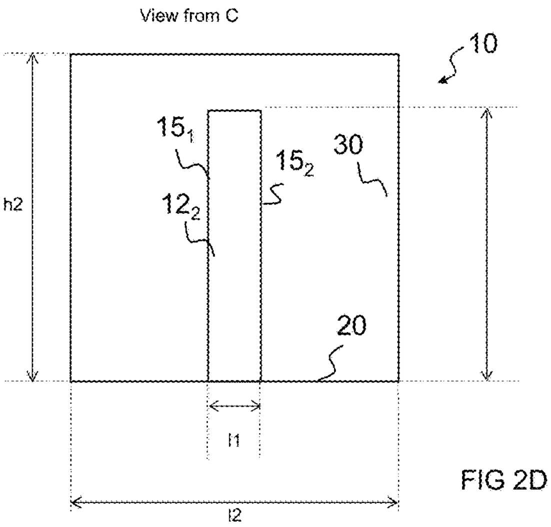

As illustrated in FIGS. 2A and 2D, the second support $\mathbf{12}_2$ comprises a first edge $\mathbf{15}_1$ extending from a base $\mathbf{17}_1$, distal from the coupling element 14, to a top $\mathbf{19}_1$, proximal to the coupling element 14.

As illustrated in FIGS. 2B and 2D, the second support $\mathbf{12}_2$ comprises a second edge $\mathbf{15}_2$ extending from a base $\mathbf{17}_2$, distal from the coupling element 14, to a top $\mathbf{19}_2$, proximal to the coupling element 14.

The first support $\mathbf{12}_1$ and the second support $\mathbf{12}_2$ oppose each other across a gap 11. The gap 11 may be an air gap or a gap filled with a non-conductive material. The material could be solid, liquid, gas or gel or a mixture thereof.

The first edge $\mathbf{15}_1$ of the first support $\mathbf{12}_1$ is separated from the first edge $\mathbf{15}_1$ of the second support $\mathbf{12}_2$ across the gap 11 (FIG. 2A). The second edge $\mathbf{15}_2$ of the first support $\mathbf{12}_1$ is separated from the second edge $\mathbf{15}_2$ of the second support $\mathbf{12}_2$ across the gap 11 (FIG. 2B).

In these examples, the dimensions of the conductive cavity 30 are a height h2, a length l2 in a longitudinal direction and a width w2 in a lateral direction.

In these examples, the dimensions of the cavity filter element 10 are a height h1 (less than h2), a length l1 (less than l2) in the longitudinal direction and a width W=w1+2t (less than w2) in the lateral direction, where the gap 11 has a width w1 and the width-wise thickness of the first support $\mathbf{12}_1$ is t and the width-wise thickness of the second support $\mathbf{12}_2$ is t.

The values w2 and l2 depend on available room for a conductive cavity 30 or what filter performance (maximum insertion loss) is required. The size affects Q-factor and insertion loss. Typically, w2 and l2 are much less than a resonant wavelength λ of the filter. For example, values of λ/(7 to 9) are typical in 5G mMIMO filters where room is limited.

h2 is determined by available room and what peak power handling has to be met. h2 is typically much less than λ/4 like λ/7 to create a capacitive loaded structure.

The value h1 depends on the resonant wavelength λ of the filter. The cavity filter element 10 is configured to have an electrical length $L_e$ from the base $\mathbf{17}_1$, $\mathbf{17}_2$ of the first support $\mathbf{12}_1$ or the second support $\mathbf{12}_2$ of the cavity filter element 10 to a top portion of the coupling element 14 of the cavity filter element 10 that is closest to a ceiling of the cavity 30. The electrical length $L_e$ is substantially one quarter of a resonant wavelength of the cavity filter 200 i.e. $L_e=\lambda/4$. The electrical length is dependent upon the relative permittivity of the dielectric in the cavity 30. For an air-filled cavity 30, the relative permittivity is very close to 1. The height h1 can be approximately λ/4 or shorter if it is to be capacitively loaded.

The width W of the cavity filter element 10 is comprised of the width of the gap 11 between the first support and second supports $\mathbf{12}_1$, $\mathbf{12}_2$ (w1), the width (thickness) of the first support $\mathbf{12}_1$ (t) and the width (thickness) of the second support $\mathbf{12}_2$ (t). Therefore W=w1+2*t.

The dimensions W, l1 of the cavity filter element 10 and their relationship to the respective dimensions w2, l2 of the cavity 30 can be used to control an impedance of the cavity filter element 10. For example, the impedance can be controlled to be between 60 to 90 Ohms. Near 77 Ohms gives an optimum Q-factor. W is typically ~w2/3 and l1 is typically ~l2/3.

The dual supports $12_1$, $12_2$ provide a line impedance similar to a single thicker line, for example, having a thickness W.

The thickness t is not a critical parameter for electrical performance and is selected for mechanical strength. It is therefore dependent upon the material used.

The thickness t is typically greater than h1/30. In practice, for resonance frequency 2-5 GHz then 0.5-0.2 mm is a suitable value for the thickness t.

Figure 3A:
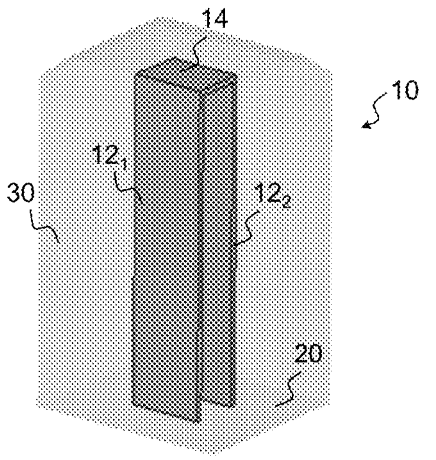
FIGS. 3A & 3B show different examples of a cavity filter element.
Figure 3B:
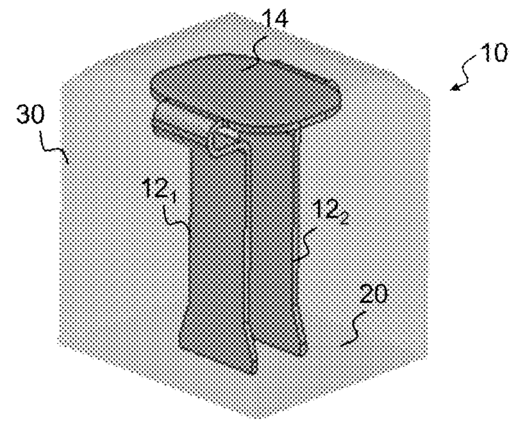

FIGS. 3A and 3B both illustrate a cavity filter element 10 as previously described. The cavity filter elements 10 in FIGS. 3A and 3B are both configured for use in a cavity filter that has the same resonant frequency.

The cavity filter elements 10 can be described as U-shaped because the first support $12_1$ and the second support $12_2$ are elongate, interconnected at their top by the coupling element 14 and are symmetric. However, in FIG. 3A the first support $12_1$ and the second support $12_2$ are straight and parallel whereas in FIG. 3B they are not. The FIGs illustrate that the height h1 of the cavity filter element 10 in FIG. 3B is less than the height h1 of the cavity filter element 10 in FIG. 3A.

The cavity filter element 10 illustrated in FIG. 3A is as illustrated in FIGS. 1A & 1B and 2A to 2D. The cavity filter element 10 is substantially an open cuboid in shape. The first support $12_1$ and the second support $12_2$ are opposing rectangles of the same size (l1×h1) and the exterior surfaces of the opposing rectangles are separated by W. The coupling element 14 is a rectangle of size l1×W.

The cavity filter element 10 illustrated in FIG. 3B is an enlarged-area cavity filter element 10. The enlarged-area cavity filter element 10 has an enlarged-area coupling element 14 that has a larger surface area than the coupling element 14 of FIG. 3A. The cavity filter element 10 illustrated in FIG. 3B has a coupling element 14 that has a surface area greater than l1*W. The surface area of the coupling element is significantly larger than the area (w1*l1) between the first and second supports $12_1$, $12_2$.

The increased surface area of the enlarged-area coupling element 14 increases capacitive coupling between the coupling element 14 and an adjacent portion of a conductive housing defining the cavity 30.

Increasing capacitive coupling lowers an effective resonant frequency of the design which can be traded for a reduction in the height h1 of the cavity filter element 10. Thus, the height h2 of the cavity 30 can be smaller and the height h1 of the cavity filter element 10 can be smaller for an enlarged-area cavity filter element 10 (e.g. FIG. 3B) than for a design without an enlarged-area coupling element 14 (FIG. 3A) for the same operational resonant frequency.

In this example, but not necessarily all examples, the cavity filter element 10 has an outwardly bent first support $12_1$ and an outwardly bent second support $12_2$. In this example, the first support $12_1$ joins a perimeter of the coupling element 14 via a goose neck bend. In this example, the second support $12_2$ joins a perimeter of the coupling element 14 via a goose neck bend.

The cavity filter element 10 is, for example, a quarter wave coaxial cavity resonator.

Figure 4:
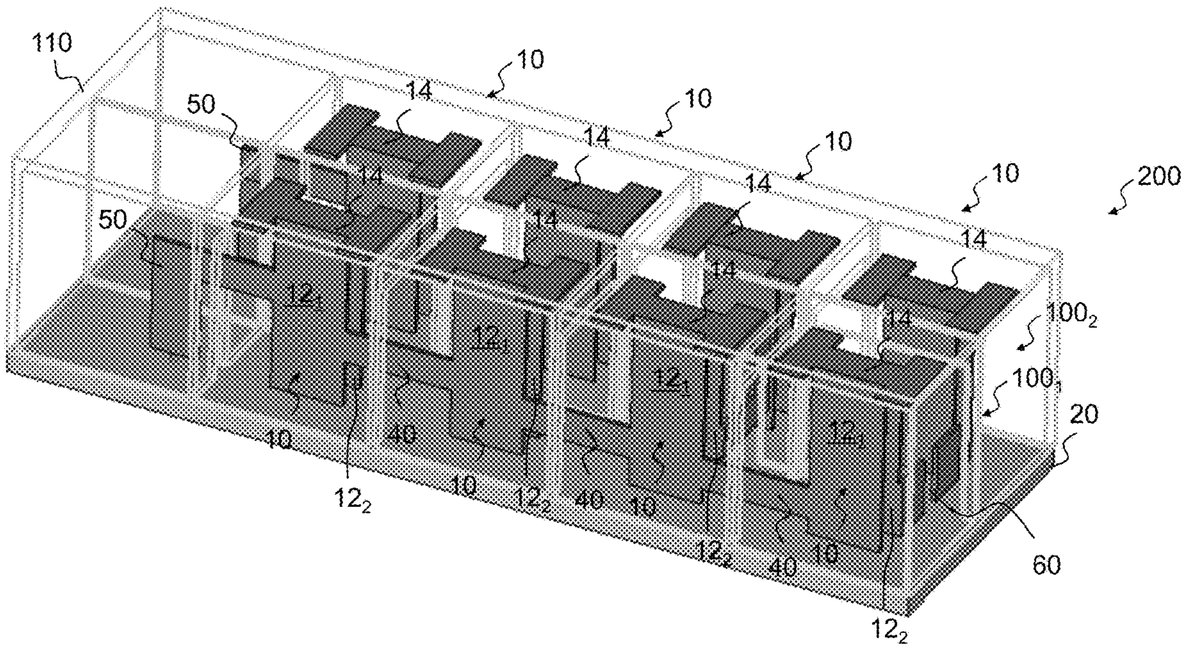
FIG. 4 shows an example of a cavity filter comprising cavity filter elements.

FIG. 4 illustrates an example of an assembled cavity filter 200.

In this example, a conductive housing 110 of the cavity filter 200 is illustrated as transparent. It would normally be opaque. The conductive housing 110 is transparent in the drawing to enable the arrangement of cavity filter elements 10 within the cavity filter 200 to be seen.

The cavity filter 200 comprises a plurality of cavity filter elements 10 that operate as resonator elements. One, some, or all of the plurality of cavity filter elements 10 are as previously described.

Each cavity filter element 10 comprises a first support $12_1$, a second support $12_2$ distinct from the first support $12_1$, and a coupling element 14 supported by the first support $12_1$ and the second support $12_2$.

In this example, but not necessarily all examples the cavity filter elements 10 are identical except for a configuration of a deformable tuning element, if any.

Adjacent ones of the cavity filter elements 10 are interconnected by conductive or metal interconnects 40 as a series 100. In this example, the metal interconnects 40 extend between adjacent first supports $12_1$ of the cavity filter elements 10 in the series 100.

In some examples, but not necessarily all examples, the series 100 of cavity filter elements 10 and the metal interconnects 40 are formed from a single piece of metal, for example a sheet of metal. In other examples some or all of the cavity filter elements 10 are formed from metallized plastic or some other non-conductive material.

Figure 5:
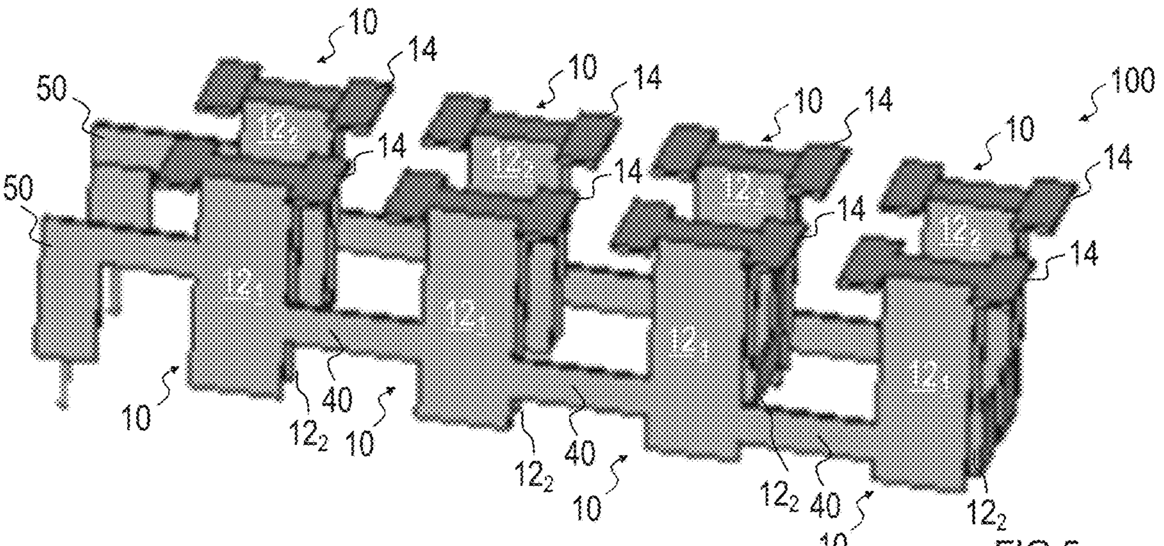
FIG. 5 shows an example of a series of cavity filter elements.

The series 100 of interconnected cavity filter elements 10, illustrated in FIG. 4 within the cavity filter 200, is illustrated as a separate component from the conductive housing 110 in FIG. 5.

The cavity filter 200 comprises a conductive housing 110 that provides conductive cavities 30 for the cavity filter elements 10.

In the example illustrated, but not necessarily all examples, the cavity filter 200 comprises a conductive housing 110 that provides a plurality of conductive cavities 30. In at least some examples, there is a conductive cavity 30 for each cavity filter element 10. In at least this example and in some other examples, one or more of the plurality of conductive cavities 30 do not comprise a cavity filter element 10.

The cavity filter element 10 is an inner conductor (extending height-wise/upward in the page). It is an 'inner conductor' to a surrounding 'outer' conductor provided by the lateral walls of the conductive cavity 30 within which the cavity filter element 10 is located. The relationship of 'inner conductor' and surrounding 'outer conductor' forms a so-called coaxial cavity filter. The series 100 of such filters forms the cavity filter 200.

The cavity filter element 10 is, for example, a quarter wave coaxial cavity resonator The cavity filter 200 is a radio frequency filter. It can, for example be used at frequencies above ~0.7 GHz. The size of the cavity filter 200 can be reduced when it operates at higher frequencies. It can, for example, be used at frequencies above 5 GHz.

It is generally desirable to have cavity filters 200 that are smaller and lighter. The above-described cavity filter elements 10 enable a cavity filter 200 to be manufactured that has reduced mass.

In some applications, it is particularly desirable to have cavity filters 200 that are smaller and lighter. For example, in massive multiple-input multiple-output (mMIMO) configurations, it can be desirable to have a separate cavity filter 200 for each mMIMO transmission signal path. The number of mMIMO channels can be a design parameter but it can, for example, be 32, 64, 128 or more.

In the example illustrated, the conductive housing 110 is combined with a conductive base 20, to form a conductive enclosure.

Each cavity filter element 10 is connected to the conductive base 20. For each cavity filter element 10, a galvanic current path extends from the conductive base 20 via the first support $\mathbf{12}_1$, the coupling element 14 and the second support $\mathbf{12}_2$ back to the conductive base 20. In some examples, the first support $\mathbf{12}_1$ is soldered to the conductive base 20 and the second support $\mathbf{12}_2$ is soldered to the conductive base 20.

The conductive housing 110 can be metal or metallized dielectric like plastic. The conductive base 20 can be metal, metallized dielectric like plastic or a printed wiring board (PWB), or any combination of metal, metallized dielectric like plastic and a printed wiring board.

Figure 6:
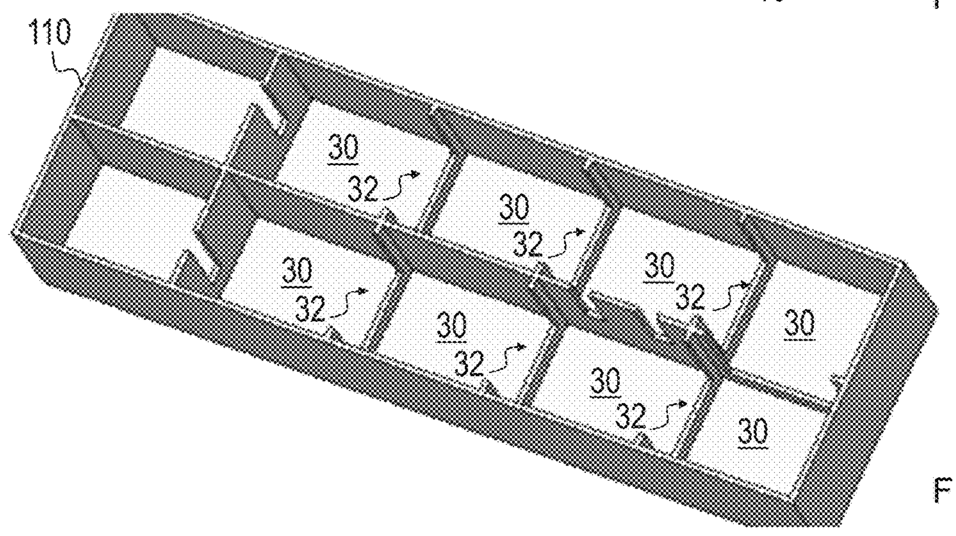
FIG. 6 shows an example of a housing for a cavity filter.

The conductive housing 110 illustrated in FIG. 4 with cavity filter elements 10, is illustrated as a separate component from the cavity filter elements 10 in FIG. 6.

In the illustrated example, the plurality of cavity filter elements 10 within the cavity filter 200 comprise one or more series 100 of cavity filter elements 10. In the example illustrated the four cavity filter elements 10 to the foreground in FIG. 4 are interconnected by interconnects 40 to form a first series $\mathbf{100}_1$ of cavity filter elements 10. In the example illustrated the four cavity filter elements 10 to the background in FIG. 4 are interconnected by interconnects 40 to form a second series $\mathbf{100}_2$ of cavity filter elements 10.

In the example illustrated the first series $\mathbf{100}_1$ extends from a feed 50 to a coupler 60 and the second series $\mathbf{100}_2$ extends from a feed 50 to the coupler 60. In the example illustrated the first series $\mathbf{100}_1$ and the second series $\mathbf{100}_2$ are capacitively coupled together at the coupler 60 and are separated across a gap. In the other examples, the first series $\mathbf{100}_1$ and the second series $\mathbf{100}_2$ can be coupled at the coupler 60 in different ways and can be physically (galvanically) interconnected.

The feeds 50 are configured as a stripline that can be connected straight to a printed wiring board (PWB) line or to a coaxial line through the base 20. Changing the contact point of the feed 50 to the cavity filter element 10 can change coupling bandwidth. For example a height of the contact point to the first support $\mathbf{12}_1$ can be varied.

Coupling between adjacent cavity filter elements 10 is made via apertures 32 in the conductive housing separating the cavity filter elements 10. The metal interconnects 40 can, in at least some examples, pass through the apertures 32.

Coupling between adjacent cavity filter elements 10 in the series 100 can be configured by configuring the metal interconnects 40 that interconnect cavity filter elements 10 that are adjacent in the series 100.

The coupling provided by a metal interconnect 40 between adjacent cavity filter elements 10 can be controlled by controlling the electrical impedance of the metal interconnect 40 and by controlling a position of a contact point above the base 20 where the metal interconnect 40 meets the cavity filter element 10.

The coupling provided by a metal interconnect 40 can be minimized by:

minimizing a cross-sectional area of the metal interconnect, for example, by minimizing the height of the metal interconnect 40; and minimizing a height of a contact point above the base 20 where the metal interconnect 40 meets the cavity filter element 10, for example, by placing the metal interconnect 40 on the base 20.

In some examples, the metal interconnects 40 between different adjacent cavity filter elements 10 are identical. In some examples, the metal interconnects 40 between different adjacent cavity filter elements 10 are not identical, for example, differing in position along a first support $\mathbf{12}_1$ (differing height above the base 20) or differing in height.

Figure 7:
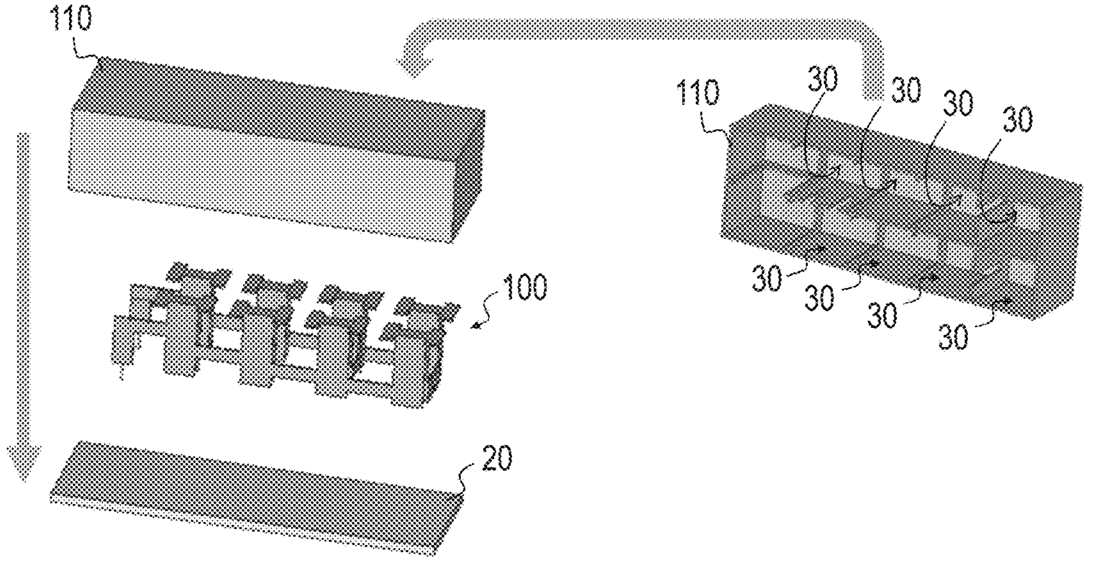
FIG. 7 shows an example of assembling a cavity filter.

FIG. 7 illustrates an example of an assembly process for the cavity filter 200 illustrated in FIG. 4.

The series $\mathbf{100}_1$, $\mathbf{100}_2$ of interconnected cavity filter elements 10 is inserted into the conductive housing 110. Each cavity filter element 10 is inserted into a cavity 30 of the conductive housing 110.

The cavities 30 of the conductive housing 110 can be filled with dielectric material before or after insertion of the series $\mathbf{100}_1$, $\mathbf{100}_2$ of interconnected cavity filter elements 10. In some examples, the dielectric is air.

The series $\mathbf{100}_1$, $\mathbf{100}_2$ of interconnected cavity filter elements 10 are enclosed within the conductive housing 110 by adding the conductive base 20. The series $\mathbf{100}_1$, $\mathbf{100}_2$ of interconnected cavity filter elements 10 can be soldered to the conductive base 20 before being enclosed within the conductive housing 110.

A series 100 of interconnected cavity filter elements 10 can be formed as a single part. For example, a series 100 of interconnected cavity filter elements 10 can be formed from a flat metal blank that is stamped to create a desired shape and is then folded to create the series 100 of interconnected cavity filter elements 10. The first support $\mathbf{12}_1$, the second support $\mathbf{12}_2$ and the coupling element 14 are positioned relative to each other to form the cavity filter element 10 by folding the metal sheet. The metal can, for example, be copper or silver-plated steel.

In other examples, the series 100 of interconnected cavity filter elements 10 can be formed as a single part using molded interconnect devices (MID) for example laser direct structuring (LDS) technologies, or any other suitable molding and plating/metallizing technologies.

The LDS process enables the metallization of injection molded plastic using an electroless process.

The conductive housing 110 can, for example, be formed by cold extrusion, metal casting, bending sheet metal, plating plastic, additive manufacturing, for example.

In at least some examples, there is a deliberate thermal expansion mismatch between the conductive housing 110 and the cavity filter elements 10, such that with increasing temperature the conductive housing expands more than the cavity filter elements 10 and gaps between the coupling elements 14 of the cavity filter elements 10 and the ceiling of the housing 110 increase rather than decrease. That is referring back to FIGS. 2A-2D, the height h2 of the cavity 30 increases more rapidly than the height h1 of the cavity filter element 10 with increasing temperature. The material defining the cavity 30 can have a larger coefficient of thermal expansion.

The thermal expansion coefficient (linear) for aluminum (Al) is approximately 21-24 μm/° C. This is a suitable material for the conductive housing 110. The thermal expansion coefficient for copper (Cu) is approximately 16-17 μm/° C. This is a suitable material for the cavity filter elements 10. The thermal expansion coefficient for steel (Fe) is approximately 11-13 μm/° C. This is a suitable material for the cavity filter elements 10.

Figure 8A:
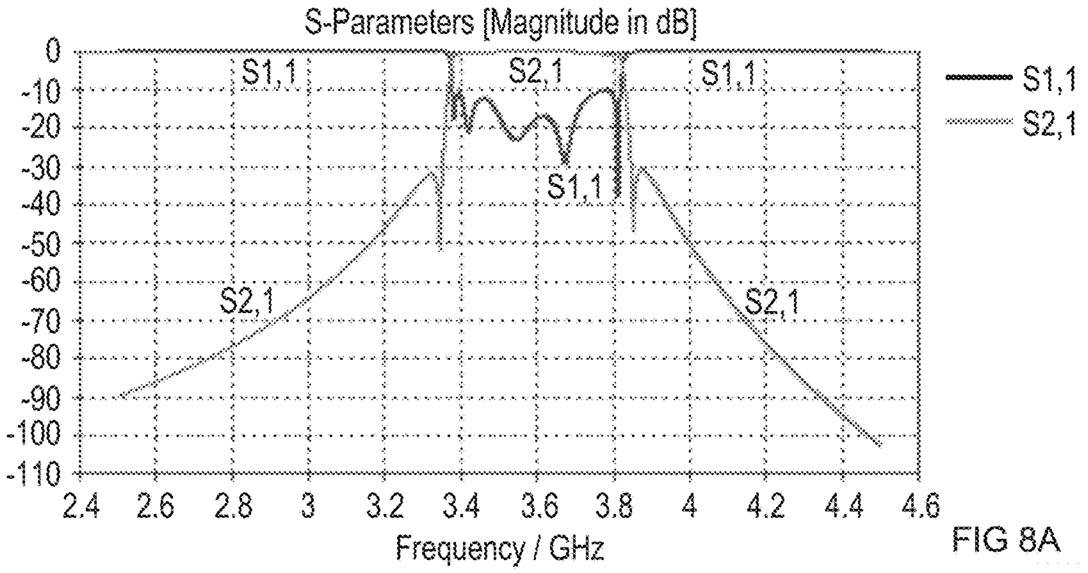
FIGS. 8A and 8B illustrate frequency response of S-parameters for the cavity filter.

FIG. 8A illustrates simulated frequency response of the S-parameters S11 and S21 for the cavity filter 200 previously described when operating at 5G n78 band.

Figure 8B:
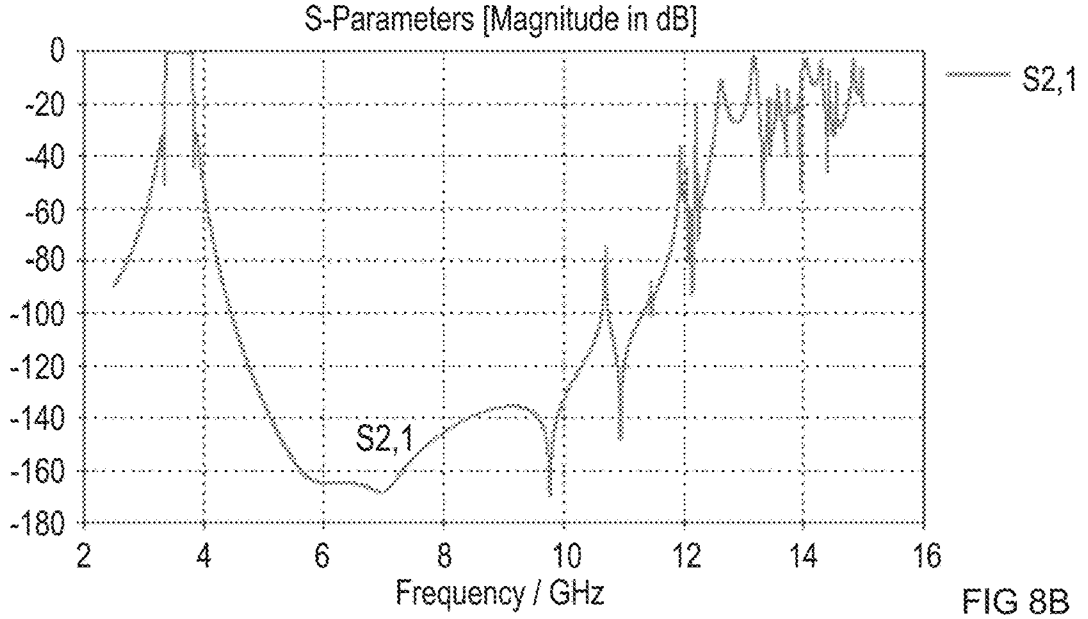

FIG. 8B illustrates simulated frequency response of the S-parameters S21 over a wider frequency range.

The filter has a wide relative bandwidth (11.4%) as illustrated in FIG. 8A and broad stop band up to 12 GHz as illustrated in FIG. 8B.

Figure 9:
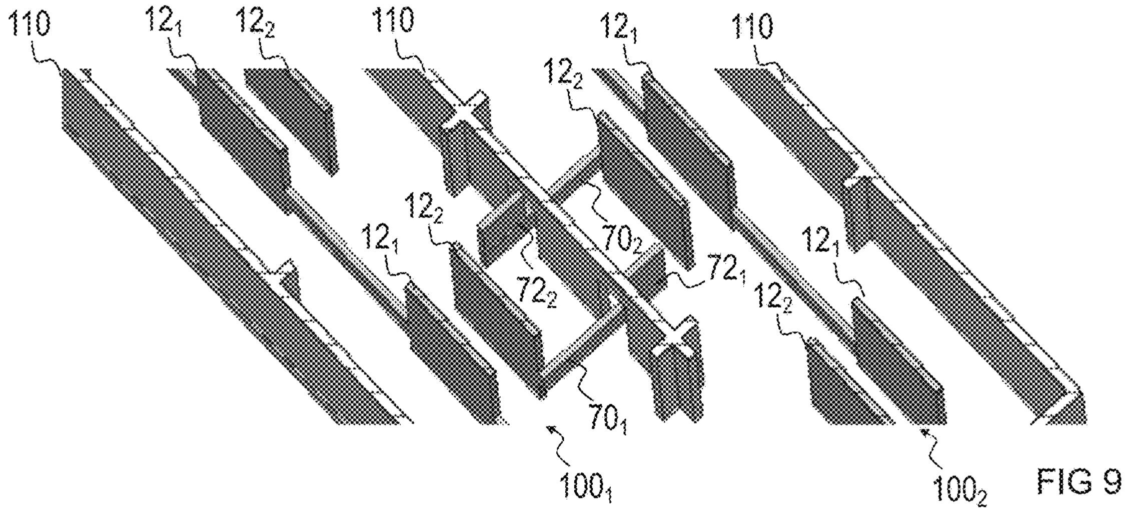
FIG. 9 illustrates cross-coupling between cavity filter elements in a cavity filter.

FIG. 9 illustrates a portion of the filter cavity 200 illustrated in FIG. 4 in more detail.

There is a first series $\mathbf{100}_1$ of cavity filter elements 10 and a second series $\mathbf{100}_2$ of cavity filter elements 10.

The cavity filter elements comprise a first support $\mathbf{12}_1$, a second support $\mathbf{12}_2$ distinct from the first support $\mathbf{12}_1$, and a coupling element 14 supported by the first support $\mathbf{12}_1$ and the second support $\mathbf{12}_2$.

One or more conductive cross-coupling interconnects 70 extend between a cavity filter element 10 of the first series $\mathbf{100}_1$ and a cavity filter element 10 of the second series $\mathbf{100}_2$.

In FIG. 9, second support $\mathbf{12}_2$ of a cavity filter element 10 of the first series $\mathbf{100}_1$ has a cross-coupling interconnect $\mathbf{70}_1$ that extends through a gap in a wall of the conductive housing 110 towards a second support $\mathbf{12}_2$ of a cavity filter element 10 of the second series $\mathbf{100}_2$. A distal portion $\mathbf{72}_1$ of the cross-coupling interconnect $\mathbf{70}_1$ is enlarged to increase capacitive coupling between the cross-coupling interconnect $\mathbf{70}_1$ and the second support $\mathbf{12}_2$ of the cavity filter element 10 of the second series $\mathbf{100}_2$.

In FIG. 9, second support $\mathbf{12}_2$ of a cavity filter element 10 of the second series $\mathbf{100}_2$ has a cross-coupling interconnect $\mathbf{70}_2$ that extends through a gap in a wall of the conductive housing 110 towards a second support $\mathbf{12}_2$ of a cavity filter element 10 of the first series $\mathbf{100}_1$. A distal portion $\mathbf{72}_2$ of the cross-coupling interconnect $\mathbf{70}_2$ is enlarged to increase capacitive coupling between the cross-coupling interconnect $\mathbf{70}_2$ and the second support $\mathbf{12}_2$ of the cavity filter element 10 of the first series $\mathbf{100}_1$.

In the illustrated example the cross-coupling interconnects 70 are between the $3^{rd}$ and $5^{th}$ resonators, that is between, the third cavity filter elements 10 from the feeds for the first and second series $\mathbf{100}_1$, $\mathbf{100}_2$.

The cross-coupling interconnects $\mathbf{70}_1$, $\mathbf{70}_2$ reverse a direction of magnetic field of the cross-coupled cavity filter element 10 compared to the next adjacent cavity filter element 10.

A cross-coupling interconnect 70 produces transmission zeros to both sides of the pass band as illustrated in FIG. 8A.

FIGS. 10A to 10E illustrate different examples of cavity filter elements 10 for use as previously described.

Figure 10A:
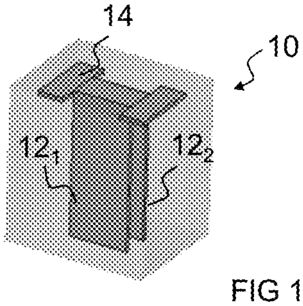
FIGS. 10A to 10E show different examples of cavity filter elements.

The cavity filter element 10 illustrated in FIG. 10A is similar to the cavity filter elements 10 illustrated in FIGS. 4 and 5. The coupling element 14 has enlarged portions at its longitudinal edges forming an I-bar shape. The supports 12 are parallel, flat rectangular sheets without cut-outs.

Figure 10B:
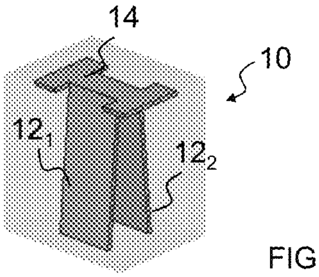

The cavity filter element 10 illustrated in FIG. 10B is similar to the cavity filter elements 10 illustrated in FIG. 10A except that the supports 12 are not parallel but are splayed.

Figure 10C:
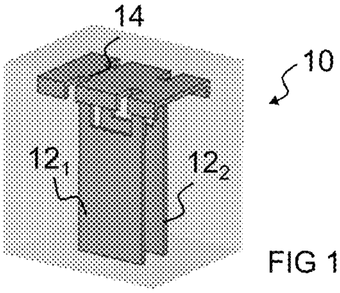

The cavity filter element 10 illustrated in FIG. 10C is similar to the cavity filter element 10 illustrated in FIG. 10A except that the coupling element 14 is further enlarged at portions intermediate of the enlarged portions of FIG. 10A. The supports 12 are parallel, flat rectangular sheets with cut-outs.

Figure 10D:
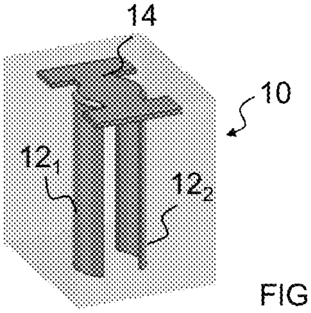

The cavity filter element 10 illustrated in FIG. 10D is similar to the cavity filter element 10 illustrated in FIG. 10A except that the coupling element 14 is further enlarged at portions intermediate of the enlarged portions of FIG. 10A. The supports 12 are vertical curved rectangular sheets without cut-outs.

Figure 10E:
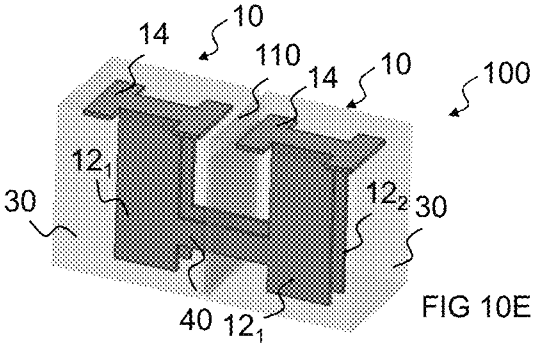

FIG. 10E illustrates a series 100 of interconnected cavity filter elements 10 as illustrated in FIG. 10A. Each adjacent pair of cavity filter elements 10 are interconnected via a conductive interconnect 40. The cavity filter elements 10 are in separated cavities 30 and the conductive interconnect 40 extends through the wall of the housing 110 separating the cavities 30 (without touching it).

Figure 11A:
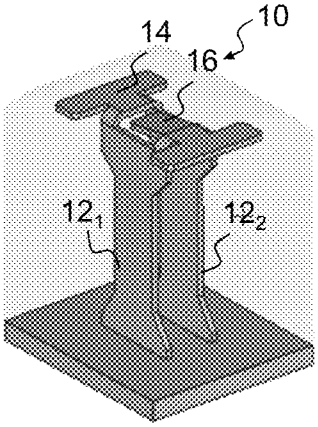
FIGS. 11A & 11B illustrate a cavity filter element with a deformable tuning.
Figure 11B:
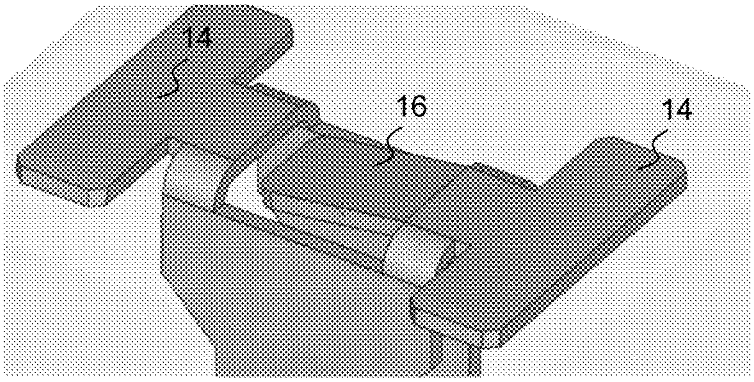

FIGS. 11A and 11B illustrate, in detail, an example of a coupling element 14 of a cavity filter element 10. In this example, the coupling element 14 comprises a deformable portion 16 that can be deformed for tuning the cavity filter element 10. The deformable portion in this example is a tab.

The deformation of the deformable portion 16 adapts an effective area of the coupling element 14 of the cavity filter element 10. In at least some examples, the deformation is a one-time-only operation during manufacture, the tab being "set" in position, i.e. the filter has been tuned.

In an assembled cavity filter 200, the conductive housing 110 can comprise an insertion hole adjacent the deformable portion 16. A tool can be inserted through the insertion hole to deform the deformable portion 16.

Figure 12A:
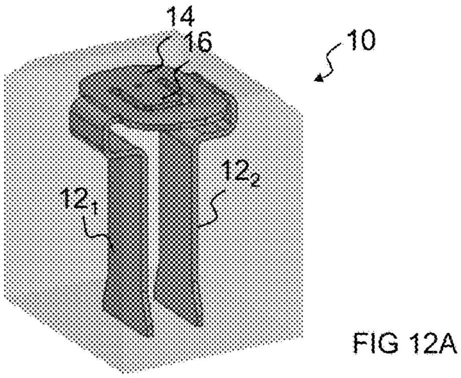
FIGS. 12A & 12B illustrate an example of cavity filter element and an example series of the cavity filter elements.

FIG. 12A illustrates a different example of the cavity filter element 10 with a deformable portion 16. The shape of the cavity filter element 10 has been previously described with reference to FIG. 3B.

Figure 12B:
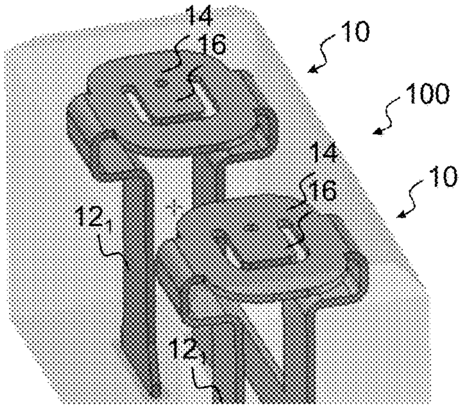

FIG. 12B illustrates a series 100 of cavity filter elements 10 as illustrated in FIG. 12A. Each cavity filter element 10 in the series has a deformable portion 16.

Figure 13A:
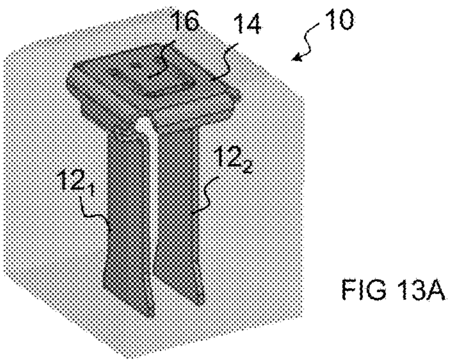
FIGS. 13A & 13B illustrate an example of cavity filter element and an example series of the cavity filter elements.

FIG. 13A illustrates a different example of the cavity filter element 10 with a deformable portion 16. The shape of the cavity filter element 10 is similar to that in FIG. 12A but the coupling element 14 has downwardly projecting lips at its longitudinal edges.

Figure 13B:
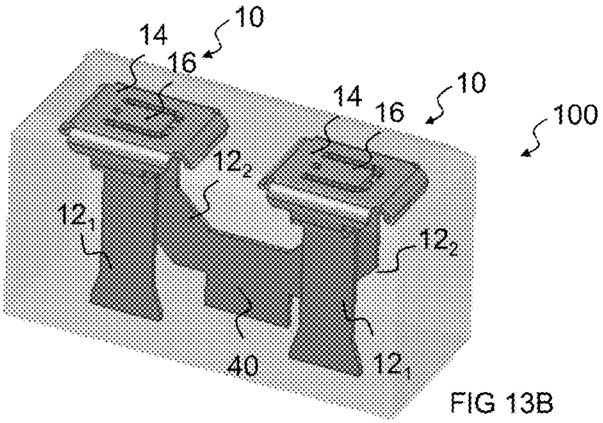

FIG. 13B illustrates a series 100 of cavity filter elements 10 as illustrated in FIG. 13A. Each cavity filter element 10 in the series has a deformable portion 16.

It should be noted that in this example and in other examples not illustrated, the second supports $\mathbf{12}_2$ of adjacent cavity filter elements 10 share a common base. A Y-shaped support rises from that base and splits to provide a second support $\mathbf{12}_2$ to one cavity filter element 10 and a second support $\mathbf{12}_2$ to another adjacent cavity filter element 10. The shared support also provides a conductive interconnect 40 between the adjacent cavity filter element 10.

Although the shared support is illustrated in FIG. 13B in a series 100 of cavity filter elements 10 as illustrated in FIG. 12, other configurations of cavity filter elements 10 can be used.

The cavity filters 200 can be configured to operate in one or more operational resonant frequency bands. For example, the operational frequency bands may include (but are not limited to) specified in the current release of 3GPP TS 36.101.

A frequency band over which the cavity filter 200 can efficiently operate is a frequency range where the cavity filter's return loss ($-20 \log_{10}|S11|$) is more negative than an operational threshold and the insertion loss ($-20 \log_{10}|S21|$) is less negative than an operational threshold value.

Figure 14:
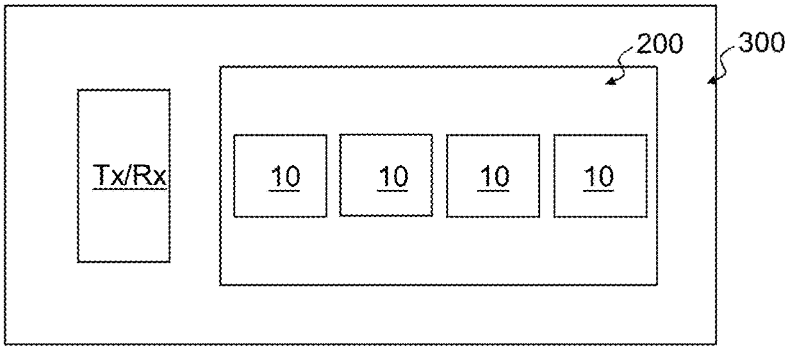
FIG. 14 illustrates an apparatus comprising a cavity filter comprising cavity filter elements.

FIG. 14 illustrates a radio apparatus 300 comprising at least one cavity filter 200 comprising cavity filter elements 10. The apparatus 300 can be any suitable apparatus, for example, a base station/Remote Radio Head/Customer Premise Equipment/Radio Device/etc. The apparatus 300 can for example be a radio apparatus that comprises a transmitter (Tx) and/or a receiver (Rx) for radio signals. The radio apparatus is configured to transmit and/or receive radio signals. The radio apparatus 300 can for example comprise a transmitter and/or a receiver for radio telecommunication signals that transport data. The radio apparatus 300 can for example be a transmitter and/or a receiver for radio cellular telecommunication signals.

As used here 'module' refers to a unit or apparatus that excludes certain parts/components that would be added by an end manufacturer or a user.

A cavity filter element 10 can be a module. A series 100 of cavity filter elements 10 can be a module. A cavity filter 200 comprising cavity filter elements 10 can be a module.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. An apparatus, comprising:

a series of cavity filter elements, wherein the cavity filter elements comprise:

a first support, a second support distinct from the first support, and a coupling element supported by the first support and the second support, wherein adjacent ones of the cavity filter elements of the series of cavity filter elements are interconnected by conductive interconnects, wherein the series of cavity filter elements and the conductive interconnects are formed as a single part, wherein the conductive interconnects extend between and are in contact with adjacent first supports of the cavity filter elements in the series of cavity filter elements, and are separated from contact with the second support of each cavity filter element in the series of cavity filter elements.

2. The apparatus as claimed in claim 1, wherein the first support of the cavity filter elements comprises:

a first edge extending from a base, distal from the coupling element, to a top, proximal to the coupling element, and a second edge extending from a base, distal from the coupling element, to a top, proximal to the coupling element;

wherein the second support of the cavity filter elements comprises:

a first edge extending from a base, distal from the coupling element, to a top, proximal to the coupling element, and a second edge extending from a base, distal from the coupling element, to a top, proximal to the coupling element;

wherein the first support and the second support oppose each other across a gap, the first edge of the first support being separated from the first edge of the second support across the gap and the second edge of the first support being separated from the second edge of the second support across the gap.

3. The apparatus as claimed in claim 1, wherein the first support, the second support and the coupling element of the cavity filter elements are electrically conductive, and a galvanic current path extends via the first support to the second support via the coupling element.

4. The apparatus as claimed in claim 1, wherein the first support, the second support and the coupling element of the cavity filter elements and the conductive interconnects are formed from a folded sheet of metal.

5. The apparatus as claimed in claim 1, wherein at least one coupling element of the cavity filter elements comprises a deformable portion that can be deformed for tuning a cavity filter element.

6. The apparatus as claimed in claim 1, wherein the conductive interconnects are metal interconnects.

7. The apparatus as claimed in claim 1, wherein the conductive interconnects extend between adjacent first supports of the cavity filter elements.

8. The apparatus as claimed in claim 7, wherein at least one of the conductive interconnects have different positions along the first supports.

9. The apparatus as claimed in claim 1, wherein the series of cavity filter elements and the conductive interconnects are formed from a single piece of metal.

10. The apparatus as claimed in claim 1, wherein the cavity filter elements in the series of cavity filter elements are identical.

11. The apparatus as claimed in claim 1, comprising:

a first series of cavity filter elements, wherein the cavity filter elements of the first series comprise:

at least a first support, a second support distinct from the first support, and a coupling element supported by the first support and the second support, wherein adjacent ones of the cavity filter elements of the first series of cavity filter elements are interconnected by conductive interconnects, wherein the first series of cavity filter elements and the conductive interconnects are formed as a single part; and a second series of cavity filter elements, wherein the cavity filter elements of the second series comprise:

at least a first support, a second support distinct from the first support, and a coupling element supported by the first support and the second support; and at least one conductive cross-coupling interconnect extending between a cavity filter element of the first series and a cavity filter element of the second series, wherein adjacent ones of the cavity filter elements of the second series of cavity filter elements are interconnected by conductive interconnects, wherein the series of cavity filter elements and the conductive interconnects are foi lied as a single part.

12. The apparatus as claimed in claim 11, wherein the first series of cavity filter elements are formed from a single piece of metal and wherein the second series of cavity filter elements are formed from a different single piece of metal.

13. The apparatus as claimed in claim 1, wherein the apparatus is configured as a cavity filter that comprises a conductive housing that provides conductive cavities for the cavity filter elements.

14. An apparatus as claimed in claim 13, wherein the cavity filter elements are inner conductors to surrounding outer conductive cavities provided by the housing.

15. The apparatus as claimed in claim 13 wherein the cavity filter elements are configured to have an electrical length, from a base of the first support or the second support of the cavity filter element to a top at the coupling element of the cavity filter element, that is substantially one quarter of a resonant wavelength of the cavity filter.

16. The apparatus as claimed in claim 1, further comprising a transmitter and/or a receiver.

* * * * *